United States Patent
Kumar

(10) Patent No.: US 10,191,902 B2
(45) Date of Patent: Jan. 29, 2019

(54) METHOD AND UNIT FOR BUILDING SEMANTIC RULE FOR A SEMANTIC DATA

(71) Applicant: Wipro Limited, Bangalore (IN)

(72) Inventor: Shishir Kumar, Patna (IN)

(73) Assignee: WIPRO LIMITED, Bangalore (IN)

( * ) Notice: Subject to any disclaimer, the term of this patent is extended or adjusted under 35 U.S.C. 154(b) by 182 days.

(21) Appl. No.: 15/082,324

(22) Filed: Mar. 28, 2016

(65) Prior Publication Data
US 2017/0235717 A1    Aug. 17, 2017

(30) Foreign Application Priority Data
Feb. 12, 2016  (IN) .............................. 201641005071

(51) Int. Cl.
| | | |
|---|---|---|
| G06F 17/27 | (2006.01) | |
| G06F 17/28 | (2006.01) | |
| G06N 5/02 | (2006.01) | |
| G06F 17/30 | (2006.01) | |

(52) U.S. Cl.
CPC ........ *G06F 17/279* (2013.01); *G06F 17/2785* (2013.01); *G06F 17/28* (2013.01); *G06F 17/30734* (2013.01); *G06N 5/025* (2013.01); *G06F 17/274* (2013.01)

(58) Field of Classification Search
CPC combination set(s) only.
See application file for complete search history.

(56) References Cited

U.S. PATENT DOCUMENTS

| | | |
|---|---|---|
| 8,065,655 B1 | 11/2011 | Deo et al. |
| 8,140,556 B2 | 3/2012 | Rao et al. |
| 2005/0197991 A1 | 9/2005 | Wray et al. |

OTHER PUBLICATIONS

Bak, J., et al., "Graph-based Editor for SWRL Rule Bases", *Joint Proceedings of the 7th International Rule Challenge, the Special Track on Human Rule Challenge, the Special Track on Human Language Technology and the 3rd RuleML Doctoral Consortium hosted at the 8th International Symposium on Rules (RuleML2013)*, Jul. 13, 2013, pp. 1-12.
Orlando, J.P., et al., "SWRL Rule Editor: A Web Application as Rich as Desktop Business Rule Editors", *Proceedings of the 14th International Conference on Enterprise Information Systems*, Aug. 22, 2012, pp. 258-263.
O'Connor, M., et al., "Supporting Rule System Interoperability on the Semantic Web with SWRL", *ISWC, LNCS*, vol. 3729, Nov. 6, 2005, pp. 974-986.
Kumar, S., IN 3914 CH 2015, "System and Method for Performing Verifiable Query on Semantic Data", Aug. 14, 2015, pp. 1-24.
Extended European Search Report issued in the European Patent Office in counterpart European Application No. 16162502.5, dated Jul. 20, 2017, 9 pages.

*Primary Examiner* — Vu B Hang
(74) *Attorney, Agent, or Firm* — Finnegan, Henderson, Farabow, Garrett & Dunner, LLP

(57) ABSTRACT

The present disclosure relates to a method and unit for building semantic rule for a semantic data which includes initially receiving one or more actions performed by a user on a visualization user interface associated with a semantic rule building unit. Upon receiving, the one or more actions are processed to determine a plurality of clauses comprising at least antecedent clauses and consequent clauses associated with the semantic rule. Further, a sequence associated with the plurality of clauses is determined based on the one or more actions. The semantic rule for the semantic data is generated based on the determined sequence.

14 Claims, 11 Drawing Sheets

METHOD AND UNIT FOR BUILDING SEMANTIC RULE FOR A SEMANTIC DATA

FIELD OF THE DISCLOSURE

The present subject matter generally relates to a method for building semantic rules. More particularly, but not exclusively, the present disclosure discloses a method and a unit for building semantic rules for semantic data for non-programmers using a visualization user interface.

BACKGROUND

Semantic rules provide definitions of relations between words and symbols. There exists Semantic Web Rule Language (SWRL) specification for enabling creation of Ontology Web Language (OWL)/Resource Description Framework (RDF) titles. Further, Jena rules are implemented which define a semantic web rule specification. Jena rule syntax is of a predefined format which is given as an antecedent followed by a consequent where both the antecedent and the consequent are conjunctions of atoms written as $a_1 \wedge \ldots \wedge a_n$. Further, in Jena rule syntax, variables are indicated using standard convention of prefixing them with a question mark (for example ?x), where x is the variable. Other elements found in the Jena rules are URIs of ontology classes, properties, individuals and literals, along with any built-in functions.

In order to write a rule in the Jena rule syntax, a user needs to have knowledge of Jena rule syntax as well as the RDF/OWL ontology schema and individuals information such as classes URIs, properties URIs, individuals URIs and so on. When such rules need to be created, updated and read by a user, the user need to be an expert and may require knowledge in field of Jena rule syntax and RDF. For a business user, there may be a need to hire a specialist for performing the reading and writing of such rules. However, for the specialist too, the task of writing and reading may be cumbersome, time taking and error prone process due to the sheer number of URIs being available in the ontology/RDF data or may tend to commit typographical errors.

Existing systems disclose one or more conventional techniques for automated generation of rules in order to eliminate the need for the specialists. One of the techniques aims in simplifying querying of ontologies. One or more queries for querying ontology are automatically generated in a language suitable for querying the ontology. A user may enter a query in a simple language such as a natural language query. In response, the one or more queries capable of querying the ontology are automatically generated in a second language. The one or more automatically generated queries may then be used to query one or more ontologies. However, there is a need for the user to interpret the query accurately in the natural language for obtaining the requiring queries.

Another conventional technique discloses an aspect of combining ontology representations and agents optimization for performance which may capitalize strengths of a user approaches and reduce the user weaknesses. Automatic translators are implemented to convert ontological representations, hand-coded procedures for ontological inference, and explanation-based learning to cache inference. In another conventional technique, a class diagram representing ontology is transformed to a standard representation of ontology based on Rational Software Architect (RSA) and its model transformation capabilities. The RSA transformation framework uses a Visitor-like pattern for iterating over all of Unified Modeling Language (UML) elements in a UML diagram. The framework allows the developer to configure 'Rule' classes that are executed when different types of UML elements are encountered. However, the knowledge regarding class diagram representation is required for a user to obtain the ontology and the conventional techniques do not disclose a user friendly interface for generating a rule. Further, conventional method may not be reliable for generating a semantic rule when the user is a non-programmer.

SUMMARY

Disclosed herein is a method for building semantic rules for a semantic data. The method comprises receiving one or more actions performed by a user on a visualization user interface associated with a semantic rule building unit. Upon receiving the one or more actions, a plurality of clauses comprising at least antecedent clauses and consequent clauses associated with the semantic rule is determined based on processing of the one or more actions. Further, a sequence associated with the plurality of clauses is determined based on the one or more actions and the semantic rule for the semantic data is generated based on the determined sequence.

In another embodiment, the present disclosure relates to semantic rule building unit comprising a processor, a semantic data repository and a memory coupled with the processor. The semantic data repository is configured to store a predetermined semantic rule structure and the memory stores processor-executable instructions which on execution cause the processor to perform one or more steps for building the semantic rule. The one or more steps include receiving one or more actions performed by a user on a visualization user interface associated with the semantic rule building unit. Upon receiving, the one or more actions are processed to determine a plurality of clauses comprising at least antecedent clauses and consequent clauses associated with the semantic rule and further a sequence associated with the plurality of clauses based on the one or more actions is determined. Based on the determined sequence the semantic rule for the semantic data is generated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
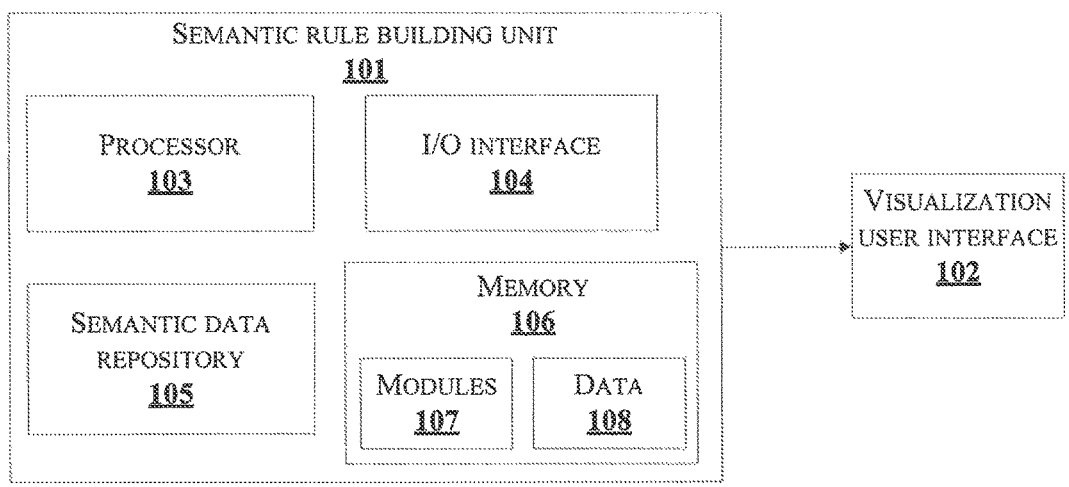
FIG. 1 illustrates an exemplary system for building semantic rule for a semantic data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative failing within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for building semantic rule for a semantic data for non-programmers using a visualization user interface. The method includes receiving one or more actions performed by a user on a visualization user interface associated with a semantic rule building unit. Upon receiving, the one or more actions are processed to determine a plurality of clauses comprising at least antecedent clauses and consequent, clauses associated with the semantic rule. Further, a sequence associated with the plurality of clauses is determined based on the one or more actions. The semantic rule for the semantic data is generated based on the determined sequence. Embodiments of the present disclosure provide a deterministic system for generating semantic rule. Embodiments of the present disclosure enable business users to build semantic rules even without any knowledge of rule syntax or ontology/RDF data. Embodiments of the present disclosure provide a user friendly interface to a user to input user actions for generation of a semantic rule. Embodiments of the present disclosure provide a robust and error free means to build a semantic rule.

FIG. 1 illustrates an exemplary system for building semantic rule for a semantic data in accordance with some embodiments of the present disclosure.

The exemplary system comprises a semantic rule building unit 101 and a visualization user interface 102 associated With the semantic rule building unit 101. The semantic rule building unit 101 comprises a processor 103, I/O interface 104, a semantic data repository 105 and a memory 106 coupled to the processor 103. The memory 106 comprises modules 107 and data 108. In one embodiment, the semantic data repository 105 may be coupled with the semantic rule building unit 101. In another embodiment, the semantic data repository 105 may be integrated within the semantic rule building unit 101. The semantic rule building unit 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

The semantic rule building unit 101 receives the data 108 such as the one or more actions and other associated data for building the semantic rule via a communication network (not shown in figure) through the I/O interface 104 of the semantic rule building unit 101. Also, the semantic rule building unit 101 provides output via the I/O interface 104. In one embodiment, the output may be provided to any other display unit (not shown in Figure) associate with the semantic rule building unit 101. Further, the I/O interface 104 is coupled with the processor 103 of the semantic rule building unit 101.

In one embodiment, the data 108 may be received by the semantic rule building unit 101 in form of data packets. In one embodiment, the communication network in the system is configured to be in listening mode and accept the data packets. In a non-limiting embodiment, the semantic rule building unit 101 decodes the received data packets as one of General Packet Radio Service (GPRS) packets, Building Automation and Controls Network (BACnet) packets, Open Building Information Exchange (OBiX) files, File Transfer Protocol (FTP) files and others associated with the data packets.

The memory 106 in the semantic rule building unit 101 is communicatively coupled to the processor 103. The memory 106 stores processor executable instructions which on execution enable the semantic rule building unit 101 to build semantic rule for the semantic data.

Initially, the semantic rule building unit 101 receives one or more actions performed by a user on the visualization user interface 102 associated with a semantic rule building unit 101. The visualization user interface 102 is configured with predefined ontologies including one or more nodes and one or more edges. The one or more nodes include at least one class, property, and individual components associated with the semantic data and the one or more edges connecting the one or more nodes, include at least one property. In one embodiment, the semantic rule building unit 101 receives the one or more actions from the user to enable interaction with the predefined ontologies in the visualization user interface 102. For example, the one or more actions may include at least one of dragging and dropping a node, clicking on an object property edge attached to a node, clicking on a data property edge attached to a node and dragging and dropping an individual component into the visualization user interface 102. Further, upon receiving the one or more actions through the I/O interface 104, the semantic rule building unit 101 processes the one or more actions to determine a plurality of clauses comprising at least antecedent clauses and consequent clauses associated with the semantic rule.

In one implementation, the semantic rule building unit 101 determines the plurality of antecedent clauses and the plurality of consequent clauses associated with the semantic rule based on the mapping of the one or more actions. In one example, the plurality of antecedent clauses are determined based on mapping of the one or more actions to predetermined antecedent clauses stored in the semantic data repository 105 and the plurality consequent clauses are determined based on mapping of each of the one or more actions to predetermined consequent clauses stored in the semantic data repository 105. Upon determining the plurality of antecedent and consequent clauses, a sequence associated with the plurality of clauses is determined. The sequence defines a path of the one or more actions performed by the user. The semantic rule for the semantic data is generated based on the determined sequence using a predetermined semantic rule structure stored in the semantic data repository 105. In one embodiment, the predetermined semantic rule structure comprises a plurality of semantic rules associated with the semantic data. In one embodiment, each of the plurality of semantic rules may comprise at least one or more unique variable name information, node information associated with the one or more nodes and edge information associated with the one or more edges. In another embodiment, the plurality of semantic rules may comprise node information associated with the one or more nodes and edge information associated with the one or more edges. One or more nodes represent entity of the plurality of semantic rules and the one or more edges represent the relationship between the one or more nodes. The semantic rule building unit 101 generates the semantic rule by obtaining the one or more nodes and the one or more edges associated with the sequence and compares the one or more nodes and the one or more edges thus obtained with corresponding nodes and edges derived from the predetermined semantic rule structure. Further, a plurality of string fragments are obtained, which comprises at least Unique Resource Identifier (URI) and a unique variable information associated with the one or more nodes and the one or more edges based on the comparison. Upon obtaining the plurality of string fragments, the plurality of string fragments ae appended to generate the semantic rule. In one embodiment, the semantic rule is exported to a text file. Here, the semantic data is represented in Resource Description Framework (RDF) and the semantic rule is represented in Jena rule syntax.

Figure 2:
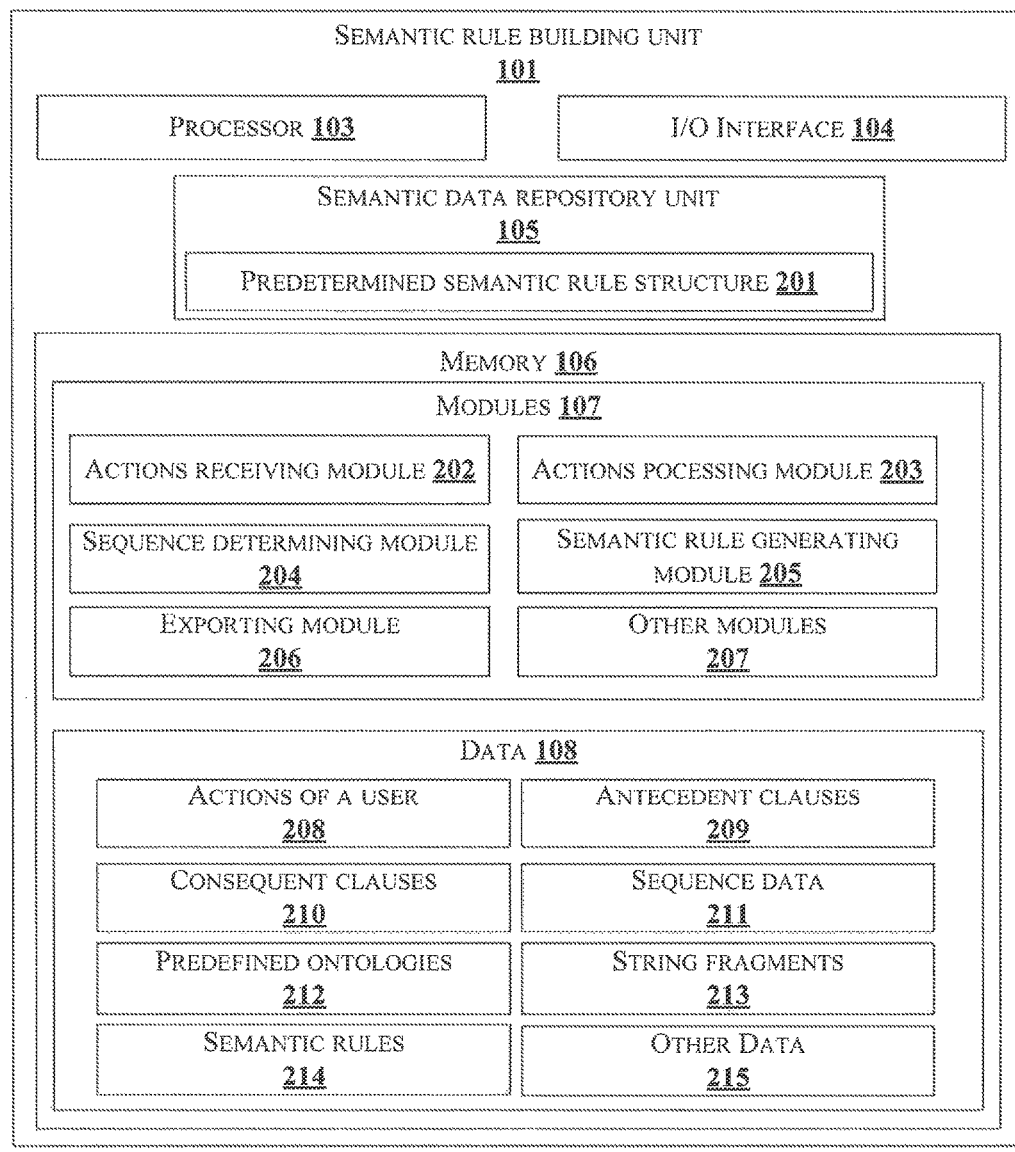
FIG. 2 illustrates a detailed block diagram of an exemplary semantic rule building unit with various data and modules for building semantic rule for a semantic data in accordance with some embodiments of the present disclosure.

FIG. 2 illustrates a detailed block diagram of an exemplary semantic rule building unit 101 with various data 108 and modules 107 for building semantic rule for a semantic data in accordance with some embodiments of the present disclosure.

In the illustrated FIG. 2, the one or more modules 107 and the one or more data 108 stored in the memory 106 are described herein in detail.

In an embodiment, the one or more data 108 in the memory 106 are processed by the one or more modules 107 of the semantic rule building unit 101. The one or more modules 107 may be stored within the memory 106 as shown in FIG. 2. In an example, the one or more modules 107, communicatively coupled to the processor 103, may not be stored in the memory 106 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 107 may include, for example, actions receiving module 202, actions processing module 203, sequence determining module 204, semantic rule generating module 205, exporting module 206 and other modules 207.

In one embodiment, the one or more data 108 may include, for example, actions of a user 208, antecedent clauses 209, consequent clauses 210, sequence data. 211, predefined ontologies 212, string fragments 213, semantic rules 214 and other data 215.

The actions receiving module 202 in the semantic rule building unit 101 receives one or more actions 208 performed by the user on the visualization user interface 102 associated with a semantic rule building unit 101. The visualization user interface 102 is configured with the predefined ontologies 212 including one or more nodes and one or more edges. In one embodiment, the visualization user interface 102 is configurable for an enterprise enabling plug and play ontology model feature and the configured visualization user interface 102 is rendered for receiving the one or more actions 208. The one or more nodes include at least one class, property, and individual components associated with, the semantic data and the one or more edges at least one property connecting the one or more nodes. The one or more actions 208 are performed on the said predefined ontologies 212. The one or more actions 208 may include at least one of dragging and dropping a node, clicking on an object property edge attached to a node, clicking on a data property edge attached to a node and dragging and dropping an individual component into the visualization user interface 102.

Upon receiving the one or more actions 208 through the I/O interface 104, the one or more actions 208 are processed to determine the plurality of clauses comprising at least the antecedent clauses 209 and the consequent clauses 210 associated with the semantic rule 214. The processing comprises determining the plurality of antecedent clauses 209 and the plurality of consequent clauses 210 associated with the semantic rule 214. The plurality antecedent clauses 209 are determined based on mapping of each of the one or more actions 208 to predetermined antecedent clauses 209 stored in the semantic data repository 105. The plurality consequent clauses 210 are determined based on mapping of each of the one or more actions 208 to predetermined consequent clauses 210 stored in the semantic data repository 105.

Upon processing the one or more actions 208, the sequence data 211 associated with the plurality of clauses 215 and 216 is determined based on the one or more actions 208. The sequence 211 defines path of the one or more actions 208 performed by the user. The semantic rule 223 for the semantic data is generated by the semantic rule generating module 205 based on the determined sequence 211. Further, generating the semantic rule 214 is based on a predetermined semantic rule structure 201 comprising a plurality of semantic rules associated with the semantic data. The predetermined semantic rule structure 201 is stored in a semantic data repository 105. In one embodiment, the plurality of semantic rules may comprise at least one or more unique variable name information, node information associated with one or more nodes representing entity of the plurality of semantic rules and edge information associated with one or more edges representing the relationship between the one or more nodes. In another embodiment, the plurality of semantic rules may comprise node information associated with one or more nodes representing entity of the plurality of semantic rules and edge information associated with one or more edges representing the relationship between the one or more nodes. In one example, the one or more unique variable name information of the semantic rule may be represented as list of strings, and antecedent "IF" and consequent "THEN" clauses associated with the semantic rule. The node information associated with the one or more nodes may comprises at least a node identification number, name of the node, node type and list of edges associated with the node. In one example, the node identification number and name of the node may be represented as string, and the node type may be selected from one or more node types including at least "individual", "class", and "property". The name of the node may be, for example, one of the unique variable names associated with the semantic rule or URI (Unique Resource Identifier) stored in the predetermined semantic rule. structure 201. The edge information associated with the one or more edges comprises for each edge, at least a unique edge identifier, edge name, edge type and relevant node information associated with the edge. In one example, the unique edge identifier and edge name may he represented as string. Edge type may be selected from one or more edge types including at least "property" and so on. Relevant node information indicates identification number of the node that acts as a connected node of the current edge.

Further generating of the semantic rule 214 comprises the steps of obtaining one or more nodes and one or more edges associated with the sequence 211, comparing the one or more nodes and the one or more edges thus obtained with corresponding nodes and edges derived from the predetermined semantic rule structure 201, obtaining a plurality of string fragments 213 comprising at least one of Unique Resource Identifier (URI) and a unique variable information associated with the one or more nodes and the one or more edges based on the comparison and appending the plurality of string fragments 213 to generate the semantic rule 214.

Upon generating the semantic rule 214, the semantic rule 214 is exporting to a text file. In one embodiment, the semantic data is represented in Resource Description Framework (RDF) and the semantic rule 214 is represented in Jena rule syntax.

The other modules 207 may refer to such modules which can be referred for building the semantic rule for the semantic data.

The other data 218 may refer to such data which can be referred for building the semantic rule for the semantic data.

Figure 3:
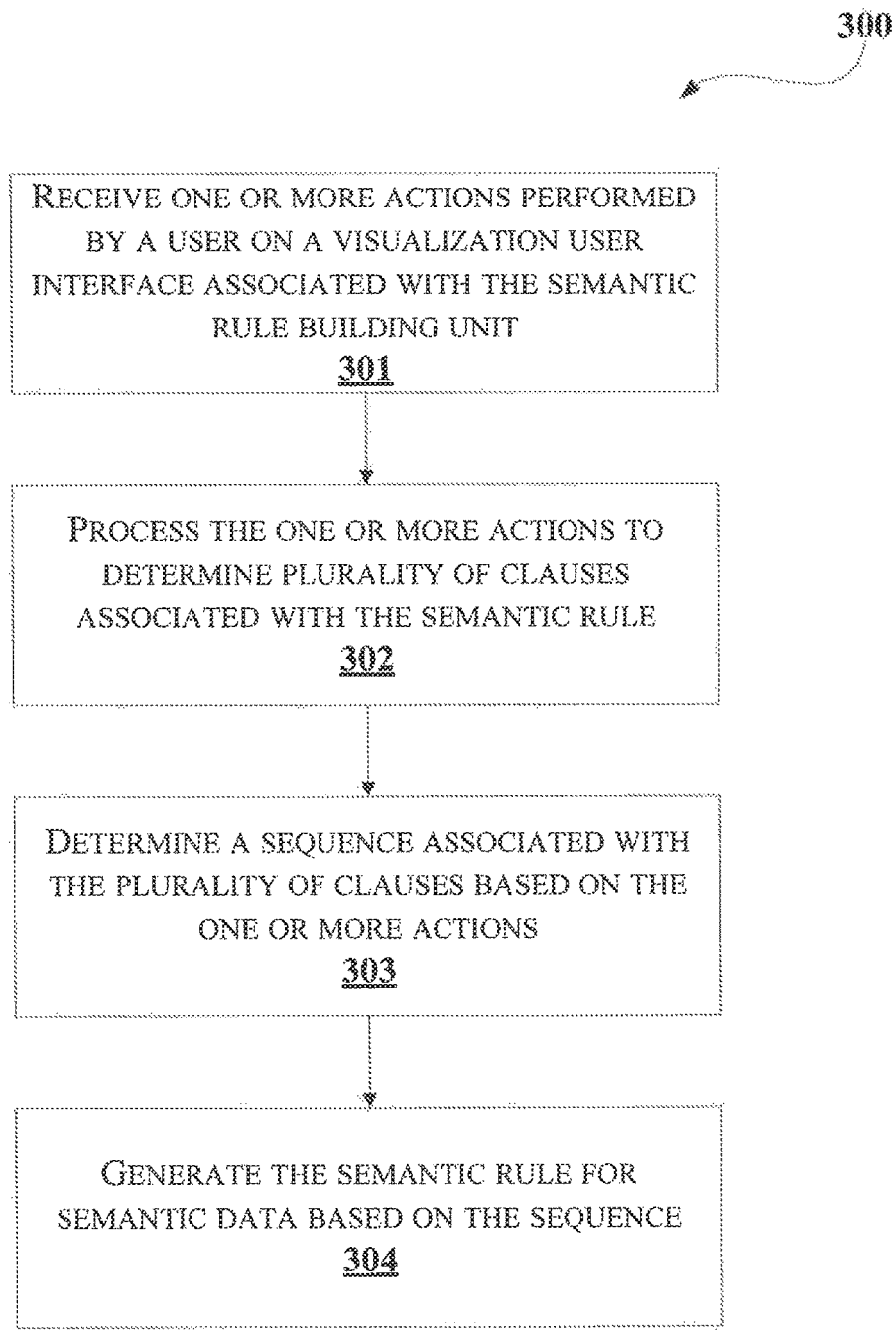
FIG. 3 shows a flowchart illustrating a method for building semantic rule for a semantic data in accordance with some embodiments of the present disclosure.

FIG. 3 shows a flowchart illustrating a method for building semantic rule for a semantic data in accordance with some embodiments of the present disclosure.

As illustrated in FIG. 3, the method 300 comprises one or more blocks for building semantic rule for the semantic data. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the actions receiving module 202 in the semantic rule building unit 101 receives one or more actions 208 performed by the user on the visualization user interface 102 which is associated with the semantic rule building unit 101. The visualization user interface 102 is configured with the predefined ontologies 212 represented as one or more nodes and one or more edges connecting the one or more nodes.

At block 302, the actions processing module 203 in the semantic rule building unit 101 processes the one or more actions 208 of the user to determine the plurality of clauses 215 and 216 associated with the semantic rules 214.

At block 303, the sequence determining module 204 in the semantic rule building unit 101 determines the sequence 211 associated with the plurality of clauses 215 and 216 associated with the semantic rule 214. The sequence 211 is path of the actions 208 maintained by the actions processing module 203, as per the user actions 208.

At block 304, the semantic rule generating module 207 in the semantic rule building unit 101 generates the semantic rule 214 for the semantic data based on the sequence 211 determined at block 303. Further the semantic rule 214 is generated based on the predetermined semantic rule structure 201 stored in the semantic data repository 105.

Figure 4:
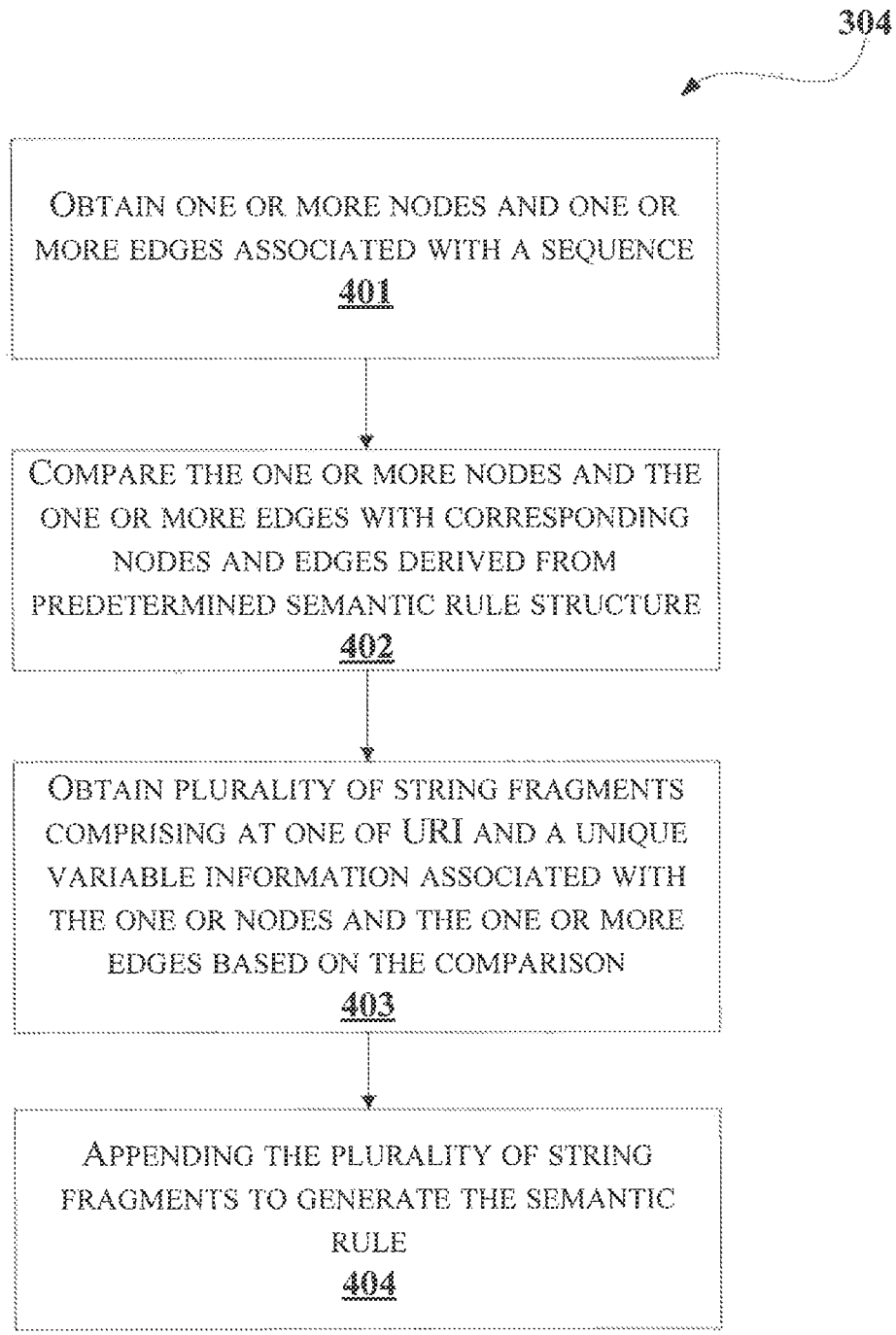
FIG. 4 shows a flowchart illustrating steps of generating sematic rule of FIG. 3 in accordance with some embodiments of the present disclosure.

FIG. 4 shows a flowchart illustrating a method for generating sematic rule in accordance with some embodiments of the present disclosure; and As illustrated in FIG. 4, the method 304 comprises one or more blocks for building semantic rule for the semantic data. The method 304 may be described in the general context of computer executable instructions. Generally, computer executable instructions can include routines, programs, objects, components, data structures, procedures, modules, and functions, which perform particular functions or implement particular abstract data types.

The order in which the method 304 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the semantic rule generating module 207 obtains one or more nodes and one or more edges associated with the sequence 211 based on the one or more actions 208.

At block 402, the semantic rule generating module 207 compares the obtained one more nodes and one or more edges with corresponding nodes and edges derived from the predetermined semantic rule structure 201.

At block 403, the semantic rule generating module 207 obtains the plurality of string fragments 213 comprising at least one of URI and the unique variable information associated with the one or more nodes and the one or more edges based on the comparison.

At block 404, the semantic rule generating module 207 appends the plurality of string fragments 213 obtained to generate the semantic rule 214.

Figure 5A:
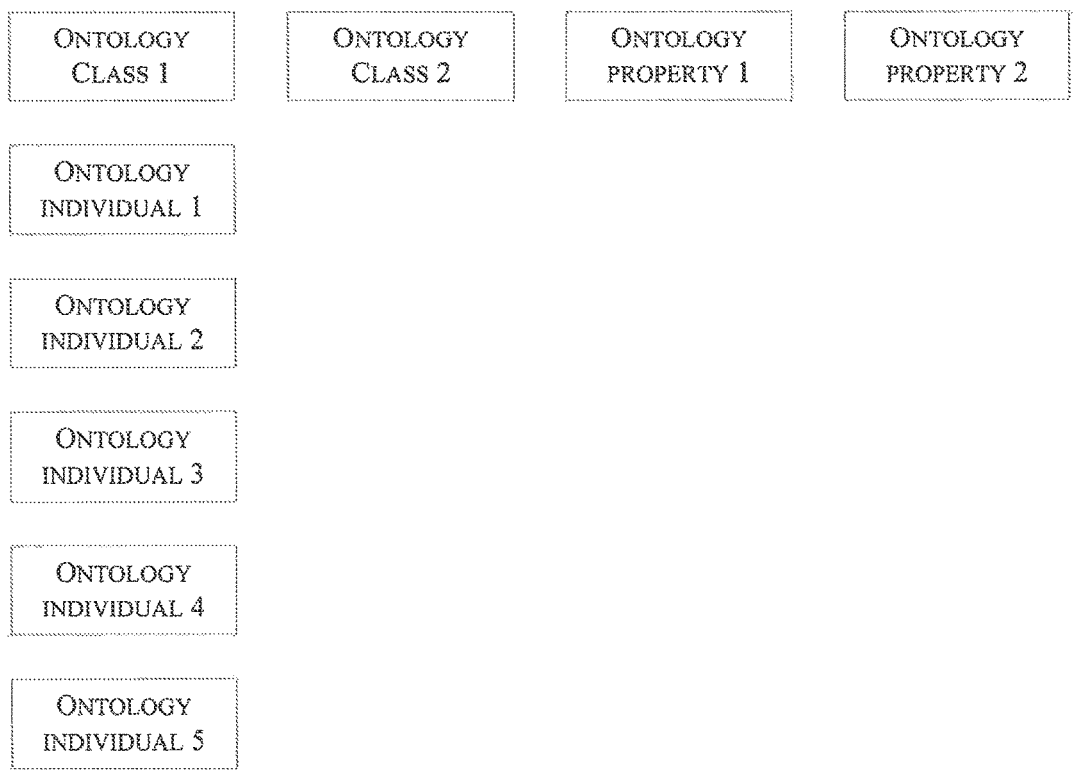
FIG. 5a illustrates an exemplary display of visualization interface in accordance with some embodiments of the present disclosure.

FIG. 5a illustrates an example of a visualization user interface 102 for building semantic rule for a semantic data in accordance with some embodiments of the present disclosure.

The visualization user interface 102 is configured with the predefined ontologies 212 as shown in FIG. 5a. The predefined ontologies 212 include at least one class, property, and individual components associated with the semantic data referred as nodes, and at least one property referred as edges connecting the one or more nodes. The one or more actions 208 are performed on the said predefined ontologies 212 and the one or more actions 208 may include at least one of dragging and dropping a node, clicking on an object property edge attached to a node, clicking on a data property edge attached to a node and dragging and dropping an individual component into the visualization user interface 102. In the example, the predefined ontologies 212 include ontology class 1, ontology class 2, ontology property 1, ontology property 2, ontology individual 1, ontology individual 2, ontology individual 3, ontology individual 4 and ontology individual 5. The user may perform the one or more actions 208 on the predefined ontologies 212. For example, the user may drag and drop the ontology class 2 onto a canvas of the visualization user interface 102.

Figure 5B:
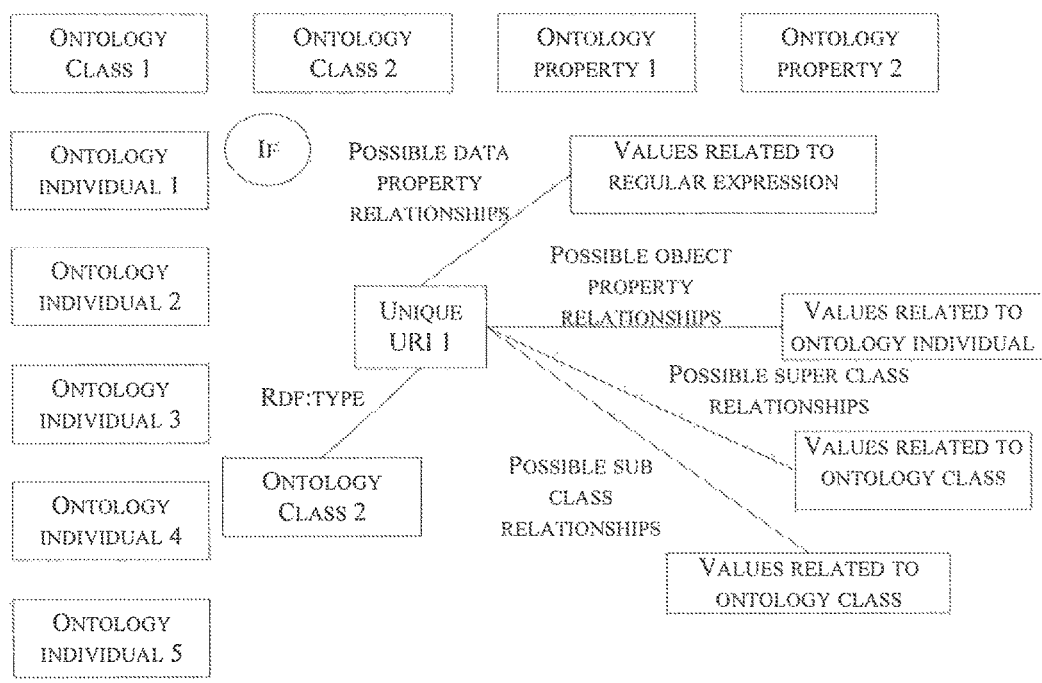
FIG. 5b, FIG. 5c and FIG. 5d illustrate an exemplary display screen of visualization interface showing determination of antecedent clauses for one or more user actions in accordance with some embodiments of the present disclosure.
Figure 5C:
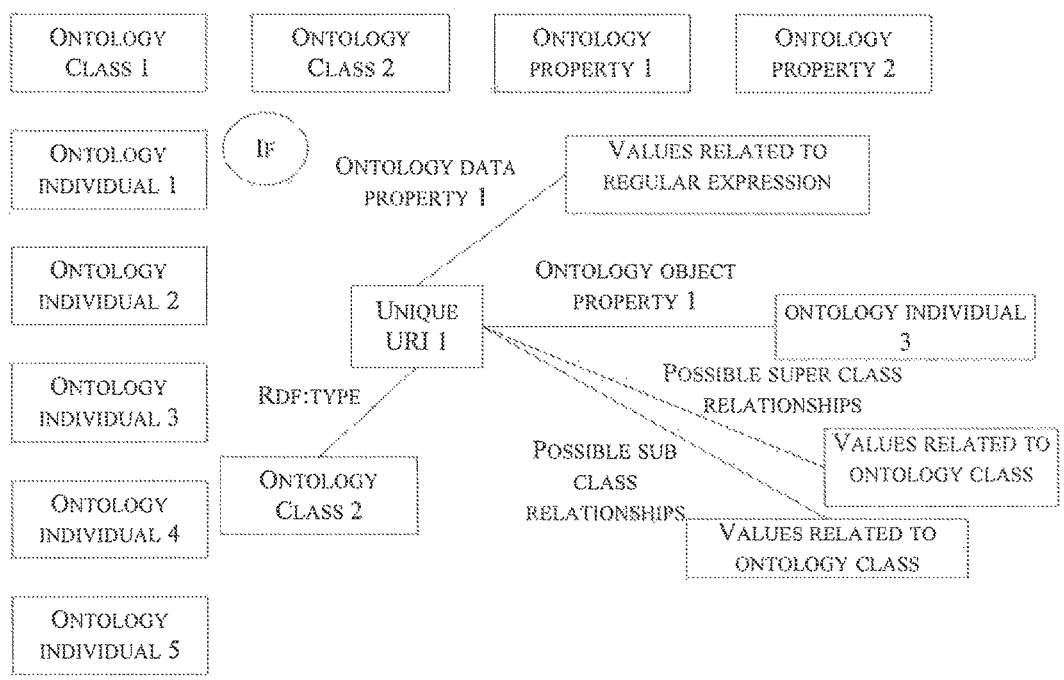
Figure 5D:
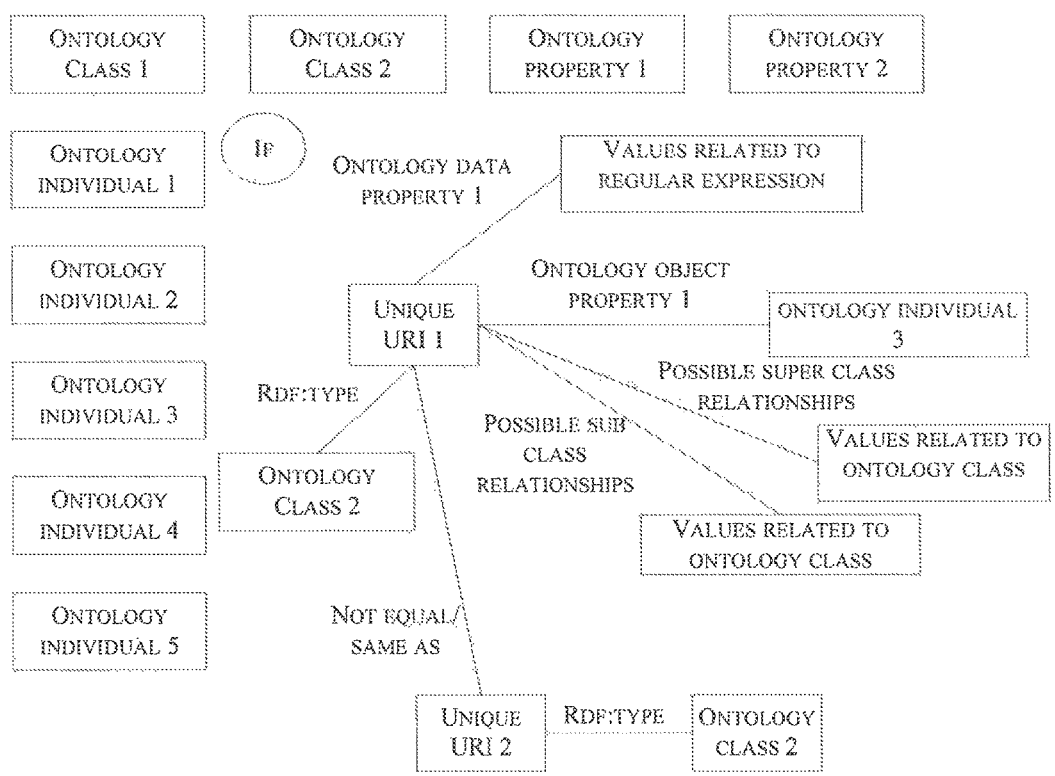

As described previously, processing of the each of the actions 208 include determining the antecedent clauses 209 and the consequent clause 216. When the user drags and drops a node into the canvas, for determining the antecedent clause 215, an option of one connecting to an already existing variable node on the canvas and creating a new variable node is provisioned to the user. Also, the variable node provides possible object property and possible data properties that may be assigned as well as illustrated in FIG. 5b. As shown in FIG. 5b, ontology class 2 is dragged and dropped in the canvas, and related unique URI is obtained and possible data properties relationships, possible object properties relationships, possible sub class relationships, possible super class relationships are provides to the user. Values related to regular expressions are selected for the possible data property relationships. Values related to ontology individual are selected for the possible object property relationships. Values related to ontology class are selected for the possible super class relationships and possible super class relationships. Further, for the consequent clauses 210 when the user drags and drops a node into the canvas, an option of connecting to an already existing variable node on the canvas is provided to the user as illustrated in FIG. 5d. Also, the node provides possible object properties and possible data properties that may be assigned as well.

When the user clicks on an object property edge attached to a node, for determining antecedent clauses 209, the user is provided with an option of one generating a new variable and connecting to an existing resource. The node which may be one of existing and new is be attached to the node to which the object property was initially attached. For example as shown in FIG. 5c, ontology object property 1 is selected from the predefined ontologies 212 and the node to be attached to the owner node i.e., the ontology class 2 is ontology individual 3. For determining the consequent clauses 210 when the user clicks on the object property edge attached to the node, an option of connecting to an existing resource or variable is provided to the user. The user selects node to be one of the resource and the variable and the selected node may be attached to the owner node to which the object property was initially attached.

When the user clicks a data property edge attached to a node, for determining the antecedent clauses 209, an option of one of generating a new variable and inputting a literal value by the user is provided to the user. The new edge may be connected to the owner node to which the data property was originally attached. For determining the consequent clauses 210 when the user clicks the data property edge attached to the node, an option of one of connecting to an existing variable which is originally attached to a data property edge and inputting a literal value is provided to the user. The new edge may be connected to the owner node to which the data property may be originally attached.

Figure 5E:
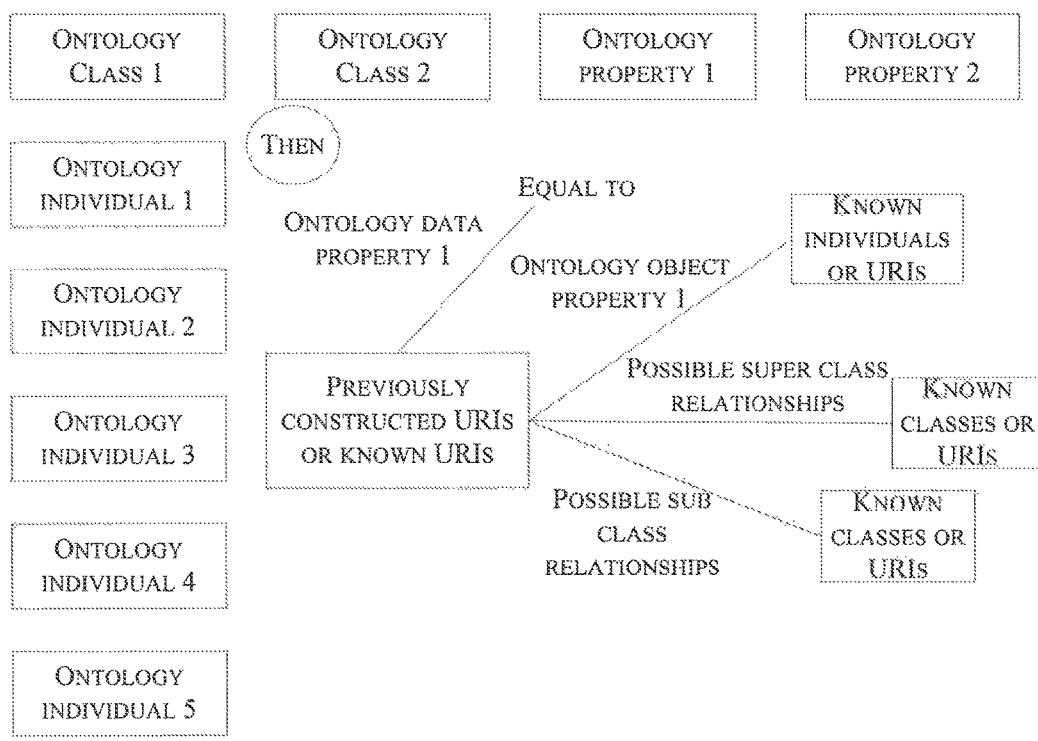
FIG. 5e illustrates an exemplary display screen of visualization interface illustrating determination of consequent clauses for one or more actions of user in accordance with some embodiments of the present disclosure.

When the user drags and drops an individual component onto the canvas, for determining antecedent clauses 209, an option of one of connecting to an already existing variable node on the canvas through an object property and connecting to an existing class node is provided to the user. The node provides possible object properties and possible data properties that may be assigned as well. For determining consequent clauses 210 when the user drags and drops an individual component onto canvas, an option of one of connecting to an already existing variable node on the canvas and connect to a class through an ontology relationship which may be object property, RDF:type and so on may be provided to the user. The node provides possible object properties and possible data properties that may be assigned as well. FIG. 5d illustrates an example of obtaining a URI 2 for a predefined condition for a node (ontology class 1). FIG. 5e illustrates an exemplary display screen for determining the consequent clauses in accordance with some embodiments of the present disclosure.

Figure 5F:
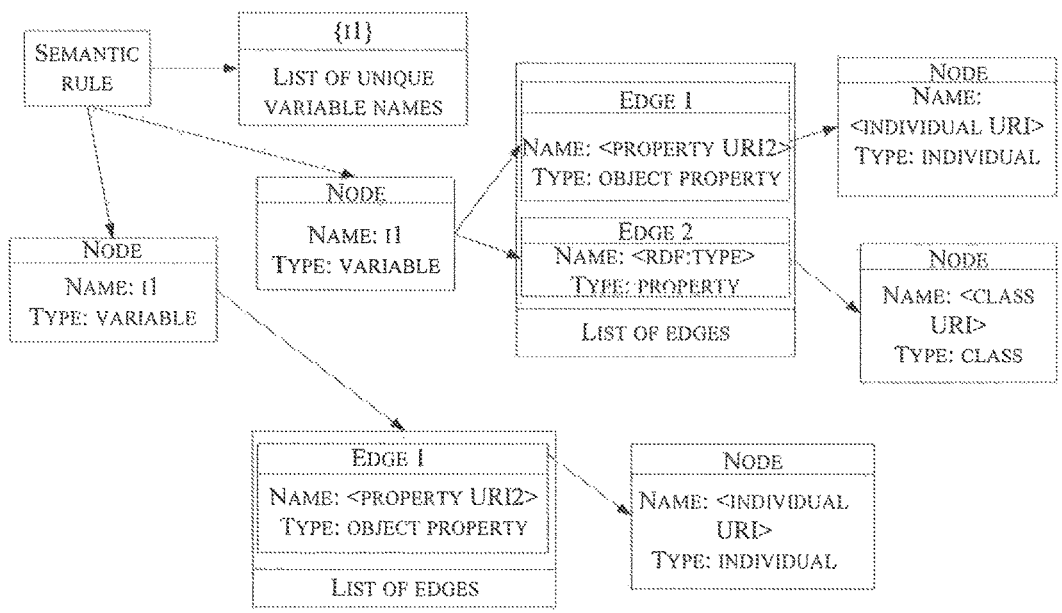
FIG. 5f illustrates an example for a predetermined semantic rule structure in accordance with some embodiments of the present disclosure.

FIG. 5e illustrates an exemplary display screen of visualization interface illustrating determination of consequent clauses 210 for one or more actions of user 208 in accordance with some embodiments of the present disclosure As illustrated in FIG. 5f, the plurality of semantic rules comprises the one or more unique variable name information, node information and the edge information. The node information is associated with the one or more nodes representing entity of the plurality of semantic rules. The edge information is associated with the one or more edges representing the relationships between the one or more nodes. The sematic rule 214 is generated based on the predetermined semantic rule structure 201 and in one embodiment the predetermined semantic rule structure 201 is updated upon building of each of the semantic rule 214.

Computer System

Figure 6:
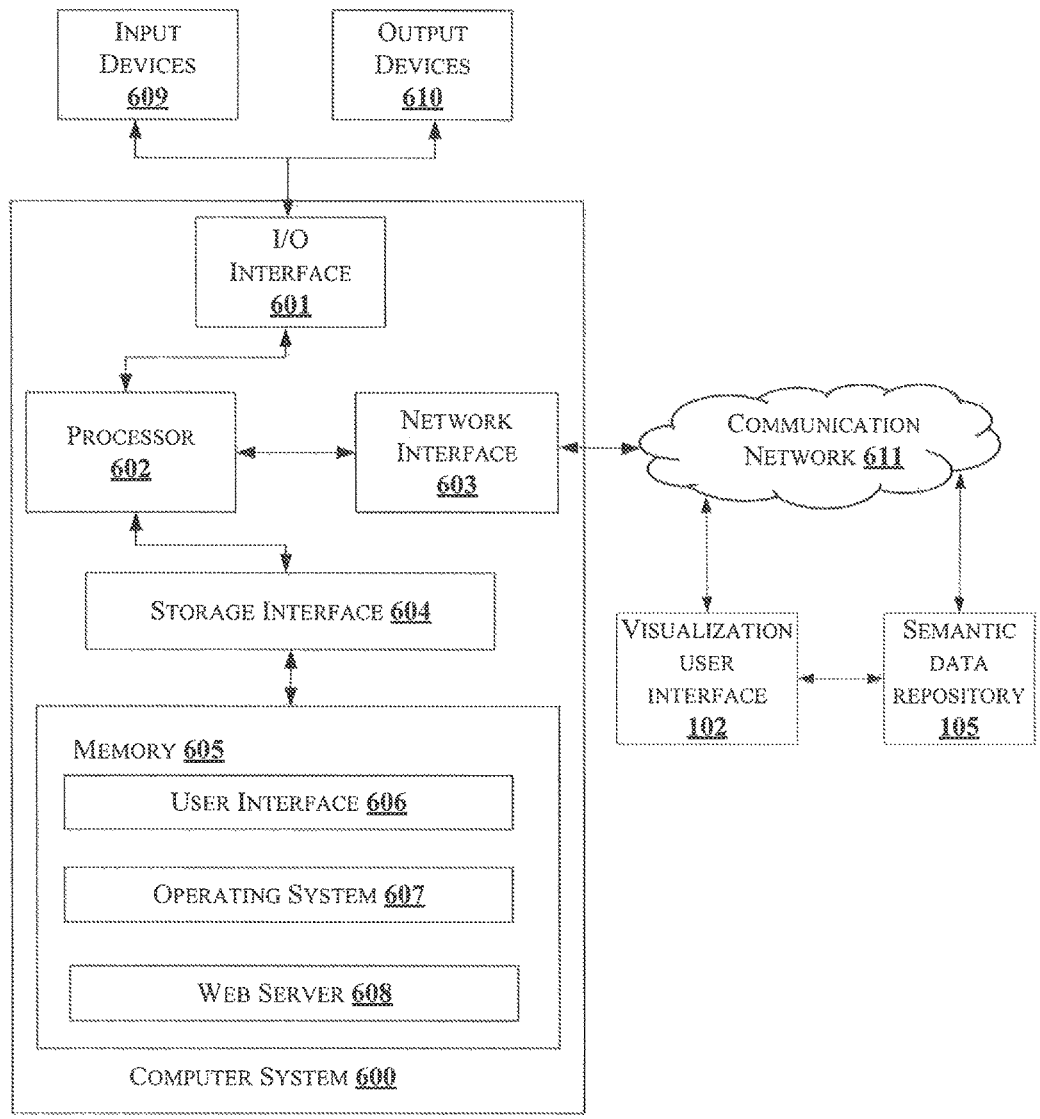
FIG. 6 is a block diagram of an exemplary computer system for implementing some embodiments consistent with the present disclosure.

FIG. 6 is a block diagram of an exemplary computer system for implementing some embodiments consistent with the present disclosure, In an embodiment, the computer system 600 is used to implement the demand limiting unit 101. The computer system 600 may comprise a central processing unit ("CPU" or "processor") 602. The processor 602 may comprise at least one data processor for executing program components for managing the performance of at least one instrumentation device deployed across one or more sites. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition. multimedia interface (HDMI), RF antennas, S-Video, VGA, IEEE 802.n /b/g/n/x, Bluetooth., cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 603 may be an antenna, keyboard, mouse, joystick, (infrared) remote control, camera, card reader, fax machine, dangle, biometric reader, microphone, touch screen, touchpad, trackball, stylus, scanner, storage device, transceiver, video device/source, etc. The output device 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 is connected to the visualization user interface 102 and the semantic data repository 105 through a communication network 611. In one embodiment, the semantic data repository 105 may be in the computer system 600. The processor 602 may be disposed in communication with the communication network 609 via a network interface 603. The network interface 603 may communicate with the communication network 609. The network interface 603 may employ connection protocols including, without limitation, direct connect, Ethernet (e, twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with the visualization user interface 102 and the semantic data repository 105. The network interface 603 may employ connection protocols include, but not limited to, direct connect, Ethernet (e,g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to the memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web server 608 etc. In some embodiments, computer system 600 may store user/application data (not shown in figure), such as the data, variables, records, etc. as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 600 may implement a web browser 608 stored program component. The web browser 608 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e, are non-transitory. Examples include Random Access Memory (RAM), Read-Only Memory (ROM), volatile memory, nonvolatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e,g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g, an integrated circuit chip, Programmable Gate Array (PGA), Application Specific Integrated Circuit (ASIC), etc.), Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of th.e shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 101 | Semantic Rule Building Unit |
| 102 | Visualization User interface |
| 103 | Processor |
| 104 | I/O Interface |
| 105 | Semantic Data Repository |
| 106 | Memory |
| 107 | Modules |
| 108 | Data |
| 201 | Predetermined Semantic Rule Structure |
| 202 | Actions Receiving Module |
| 203 | Actions Processing Module |
| 204 | Sequence Determining Module |
| 205 | Semantic Rule Generating Module |

-continued

| Referral Numerals: | |
|---|---|
| Reference Number | Description |
| 206 | Exporting Module |
| 207 | Other Modules |
| 208 | Actions of a User |
| 209 | Antecedent Clauses |
| 210 | Consequent Clauses |
| 211 | Sequence Data |
| 212 | Predefined Ontologies |
| 213 | String Fragments |
| 214 | Semantic Rules |
| 215 | Other Data |
| 600 | Computer System |
| 601 | I/O Interface |
| 602 | Processor |
| 603 | Network Interface |
| 604 | Storage Interface |
| 605 | Memory |
| 606 | User Interface |
| 607 | Operating System |
| 608 | Web Server |
| 609 | Input Devices |
| 610 | Output Devices |
| 611 | Communication Network |

I claim:

1. A method for building semantic rule for a semantic data, comprising:
　receiving, by a semantic rule building unit, one or more actions performed by a user on a visualization user interface associated with the semantic rule building unit,
　processing, by the semantic rule building unit, the one or more actions to determine a plurality of clauses comprising at least antecedent clauses and consequent clauses associated with the semantic rule;
　determining, by the semantic rule building unit, a sequence associated with the plurality of clauses based on the one or more actions;
　generating, by the semantic rule building unit, the semantic rule for the semantic data based on the determined sequence, wherein generating the semantic rule comprises the steps of:
　　obtaining one or more nodes and one or more edges associated with the sequence;
　　comparing the one or more nodes and the one or more edges thus obtained with corresponding nodes and edges derived from the predetermined semantic rule structure;
　　obtaining a plurality of string fragments comprising at least one of Unique Resource Identifier (URI) and a unique variable information associated with the one or more nodes and the one or more edges based on the comparison; and
　　appending the plurality of string fragments to generate the semantic rule; and
　displaying, by a display device, the semantic rule.

2. The method as claimed in claim 1, wherein generating the semantic rule is based on a predetermined semantic rule structure comprising a plurality of semantic rules associated with the semantic data, wherein the predetermined semantic rule structure is stored in a semantic data repository, wherein each of the plurality of semantic rules comprises at least:
　one or more unique variable name information,
　node information associated with one or more nodes representing entity of the plurality of semantic rules, and
　edge information associated with one or more edges representing the relationship between the one or more nodes.

3. The method as claimed in claim 1 further comprising, exporting the generated semantic rule to a text file.

4. The method as claimed in claim 1, wherein the semantic data is represented in Resource Description Framework (RDF) and the semantic rule is represented in Jena rule syntax.

5. The method as claimed in claim 1, wherein the visualization user interface is configured with predefined ontologies including at least one class, property, and individual components associated with the semantic data represented as nodes, and at least one property represented as edges connecting the said nodes.

6. The method as claimed in claim 5, wherein the one or more actions is performed on the predefined ontologies, the one or more actions include at least one of dragging and dropping a node, clicking on an object property edge attached to a node, clicking on a data property edge attached to a node and dragging and dropping an individual component into the visualization user interface.

7. The method as claimed in claim 1, wherein the processing of the one or more actions comprises:
　determining the plurality of antecedent clauses associated with the semantic rule based on mapping of each of the one or more actions to predetermined antecedent clauses stored in a semantic data repository; and
　determining the plurality of consequent clauses associated with the semantic rule based on mapping of each of the one or more actions to predetermined consequent clauses stored in the semantic data repository.

8. A semantic rule building unit for building semantic rule for a semantic data, comprises:
　a processor;
　a semantic data repository coupled with the processor and configured to store a predetermined semantic rule structure; and
　a memory communicatively coupled to the processor, wherein the memory stores processor-executable instructions, which, on execution, cause the processor to:
　receive one or more actions performed by a user on a visualization user interface associated with the semantic rule building unit,
　process the one or more actions to determine a plurality of clauses comprising at least antecedent clauses and consequent clauses associated with the semantic rule;
　determine a sequence associated with the plurality of clauses based on the one or more actions; and
　generate the semantic rule for the semantic data based on the sequence thus determined, wherein generating the semantic rule comprises the steps of:
　　obtaining one or more nodes and one or more edges associated with the sequence;
　　comparing the one or more nodes and the one or more edges thus obtained with corresponding nodes and edges derived from the predetermined semantic rule structure;
　　obtaining a plurality of string fragments comprising at least one of Unique Resource Identifier (URI) and a unique variable information associated with the one or more nodes and the one or more edges based on the comparison; and
　　appending the plurality of string fragments to generate the semantic rule; and
　displaying, by a display device, the semantic rule.

9. The semantic rule building unit as claimed in claim 8, wherein the generated semantic rule is based on the predetermined semantic rule structure comprising a plurality of semantic rules associated with the semantic data wherein the predetermined semantic rule structure is stored in the semantic data repository, wherein each of the plurality of semantic rules comprises at least:
- one or more unique variable name information,
- node information associated with one or more nodes representing entity of the plurality of semantic rules, and
- edge information associated with one or more edges representing the relationship between the one or more nodes.

10. The semantic rule building unit as claimed in claim 8, wherein the processor is further configured to export the generated semantic rule to a text file.

11. The semantic rule building unit as claimed in claim 8, wherein the semantic data is represented in Resource Description Framework (RDF) and the semantic rule is represented in Jena language.

12. The semantic rule building unit as claimed in claim 8, wherein the visualization user interface is configured with predefined ontologies including at least one class, property, and individual components associated with the semantic data represented as nodes, and at least one property represented as edges connecting the said nodes.

13. The semantic rule building unit as claimed in claim 12, wherein the one or more actions is performed on the predefined ontologies, the one or more actions include at least one of dragging and dropping a node, clicking on an object property edge attached to a node, clicking on a data property edge attached to a node and dragging and dropping an individual component into the visualization user interface.

14. The semantic rule building unit as claimed in claim 8, wherein the processor is configured to process the one or more actions by the steps of:
- determining the plurality of antecedent clauses associated with the semantic rule based on mapping of each of the one or more actions to predetermined antecedent clauses stored in the semantic data repository; and
- determining the plurality of consequent clauses associated with the semantic rule based on mapping of each of the one or more actions to predetermined consequent clauses stored in the semantic data repository.

* * * * *